United States Patent [19]

Berkner

[11] 3,896,254

[45] July 22, 1975

[54] COATING SEMICONDUCTOR SURFACES

[75] Inventor: Rolf Berkner, Wolkersdorf, Germany

[73] Assignee: Semikron Gesellschaft fur Gleichrichterbau u. Elektronik m.b.H., Nuremberg, Germany

[22] Filed: Nov. 7, 1972

[21] Appl. No.: 304,331

[30] Foreign Application Priority Data

Nov. 10, 1971 Germany .......................... 2155849

[52] U.S. Cl. .................. 428/411; 428/538; 427/53; 427/54; 427/82; 427/399; 427/402

[51] Int. Cl.[2] ........................ B44C 1/18; B05D 5/12

[58] Field of Search ............ 117/201, 93, 93.3, 118, 117/62, 218; 96/36.2

[56] References Cited

UNITED STATES PATENTS

| | | | |
|---|---|---|---|
| 3,188,229 | 6/1965 | Graham | 117/118 |
| 3,346,384 | 10/1967 | Gaynor | 96/36.2 |
| 3,450,017 | 10/1968 | Gee | 96/36.2 |
| 3,620,827 | 11/1971 | Collet | 117/93.3 |
| 3,650,796 | 3/1972 | Jackson | 96/36.2 |
| 3,666,548 | 5/1972 | Brack | 117/93.3 |

*Primary Examiner*—Michael F. Esposito
*Attorney, Agent, or Firm*—Spencer & Kaye

[57] ABSTRACT

Oxidation of photosensitizable organic coloring agents is effected on a semiconductor surface to form a protective oxide coating thereon.

12 Claims, No Drawings

COATING SEMICONDUCTOR SURFACES

BACKGROUND OF THE INVENTION

In preparing semiconductor devices having a high inverse voltage load capability, surface protection against undesired impurities and protection of their electrical insulation (particularly where a pn-junction intersects the surface) are especially important for optimum blocking. To produce optimum blocking, a protective lacquer or oxide (of the semiconductor material) coating is applied to or formed on relevant surface sections. Oxide coatings or layers are produced by etching and/or rinsing with oxidizing chemicals, by anodic oxidation or by pyrolytic decomposition of suitable compounds.

Unfortunately, essential improvement and stabilization of the blocking behavior are not always assured when a stabilizing oxide layer is formed in known manner on a semiconductor surface since substantial amounts of undesirable impurities are incorporated in the oxide layer during its formation. Moreover, process temperatures which are sufficiently high to have an adverse influence on physical properties of the semiconductor material are required for thermal oxidation which will yield an oxide layer of desired thickness. Although lower process temperatures may be used for oxidation bv pyrolytic decomposition, resulting oxide layers do not always satisfy the requirements for protecting semiconductor surfaces against atmospheric impurities.

In color photography certain organic coloring agents sensitize silver halide (in a photographic film layer) to light of a longer wavelength than that to which it is normally sensitive. This is called spectral sensitization. The coloring agents (employed in small quantities) are firmly adsorbed on the silver halide nucleus and transfer light energy to the halide. The halide is thus split into silver and halogen, and the coloring agents are subsequently reduced for developing the photographic layer.

SUMMARY OF THE INVENTION

A stabilizing and/or insulating coating is produced by oxidizing a semiconductor surface in a liquid solvent containing molecular oxygen and at least one dissolved organic substance which is suitable for photosensitization. Oxidation is effected by the influence of light energy on the dissolved organic substance.

An object of the present invention is to provide a clean semiconductor surface with an oxide layer which insulates and/or stabilizes the blocking behavior of the semiconductor and which prevents adverse effects of damaging impurities.

The present invention makes possible production on a semiconductor surface of a stabilizing layer while rinsing, following etching, so that special process steps to stabilize the semiconductor surface are eliminated. Expensive organic substances are required to be employed in only very small quantities and thus contribute to the economy of the process. Process conditions are virtually completely non-critical; results are thus readily reproduced. Materials used in further treatment of the semiconductor body and which, under appropriate process conditions, may evaporate or disintegrate are chemically bound in the oxide layer by incorporation of a chelate-forming substance therein so that such materials cannot adversely affect properties of the semiconductor.

DETAILED DESCRIPTION OF THE PREFERRED EMBODIMENTS

Photosensitized oxidation of semiconductor surfaces is effected by known organic coloring agents which remain adsorbed on the oxide layer formed on such surfaces.

As semiconductor matereial known elements of the IV-group of the Periodic Table and compounds of elements of the III. and V. group thereof can be used. Organic semiconductive materials and such in organic substances presented in oxidized form or forming oxygen compounds are out of question, since the semiconductor in course of the oxidizing process is involved according to this invention at the forming of the oxide layer.

Organic coloring agents suitable for photosensitizing oxidation are known and include, e.g., porphyrines; polymethines, such as cyanines; thiazines, such as thionine; and fluoranes, such as Rhodamine B. Any organic coloring agent which photosensitizes oxidation of a semiconductor surface and is soluble in a suitable solvent to the extent of about $10^{-2}$ mol per liter is useful according to this invention. Lower solubility than this indicated amount is preferred.

The organic coloring agent (oxidation photosensitizer) represents a molecular configuration (system) having conjugated double bonds in the form of a ring or a chain or in a combined form. The term "conjugated double bonds" means that single and double bonds alternate. The end of the chain or a defined corner of the ring system shows a nitrogen, sulfur or oxygen atom so that the succession of single and double bonds is completed. Such a molecular system with conjugated double bonds and terminal heteroatoms is the typical structure of photosensitizing color agents.

The organic color agent (when dissolved in a solvent) is brought to a higher energy level when excited (exposed to) by light energy. A highly reactive state is thus produced wherein the dissolved organic coloring agent temporarily enters into a bond with molecularly dissolved (in the solvent) oxygen and releases the oxygen to the semiconductor surface, which has been prepared for oxidation.

The organic coloring agent is dissolved in the solvent in an amount of, e.g., from $10^{-2}$ to $10^{-6}$ mol per liter. The solvent must have a high capacity for containing molecular oxygen, must be a solvent for the organic coloring agent and must be capable of transmitting light of suitable wavelenghts for activating the organic coloring agent. The concentration of the coloring agent in the solvent is determined by the requirement that it must be molecularly dissolved. By virtue of the high molecular weight of the provided substances the solubility of $10^{-2}$ mol per liter can be too much. A lower solubility, if required less than $10^{-6}$ mol per liter, is preferred.

The particular wavelength of light required to activate the organic coloring agent is either known or is readily determined and does not constitute an essential feature of this invention. The wavelength range of light radiation, however, is preferably from about 0.01 micron ($\mu$) to about 1 $\mu$.

Although water is suitable as the solvent, organic solvents having a high oxygen solubility, such as lower alkyl ketones, e.g. acetone, and lower alkanols, e.g. methanol, ethanol and isopropanol, are preferred. A suitable solvent may be especially enriched with molecular oxygen. Saturation concentration of molecular oxygen is different in each solvent and, moreover, oxygen solubility decreases with increasing temperature. The oxygen solubility should be high enough that, either by adsorption of oxygen from the ambient atmosphere or by its introduction in the solvent, a sufficient supply of oxygen is available for reaction with the coloring agent.

Ionizable foreign matter deposited in or on a semiconductor surface oxide layer constitutes an undesirable impurity. Such impurities (encountered by and known to the artisan) cannot always be precluded during or following development of an oxide layer according to this invention. However, organic additives which coordinately bind (by chelate formation) such impurities (thus preventing development of additional current paths in the oxide layer) may also be dissolved in the solvent with any sensitizing substance (organic coloring agent). Such additives become built into obtained oxide layers and simultaneously form a barrier against impurities which tend to diffuse into the oxide layer from further layers, such as a layer of insulating lacquer, more remote from the coated semiconductor surface.

Such further organic additive is a chelate-forming substance. Chelate-forming substances are well known and include oximes, e.g., salicylaldoxime, polyamines, e.g., ethylenediaminetetraacetic acid (EDTA), and polyols, e.g. d(+)tartaric acid. Any such chelate-forming substance is dissolved in the employed solvent with a suitable photosensitizing agent, e.g., cyanine.

Moreover, some sensitizers (organic coloring agents) actually have the ability to bind (by chelate formation) impurities either by suitable treatment or by their basic chemical structure. Sensitizers of these types are also known and include porphyrins, e.g., porphyrin, polymethines, e.g., p-dimethylaminobenzalrhodanine (particularly suited to coordinative bonding of undesirable silver ions when used in combination with silver in producing semiconductor devices), and fluoranes, e.g., calcein.

Oxide coatings (on semiconductor surfaces) prepared according to this invention ordinarily vary from a thickness of about 10 A to a thickness of about 10,000 A.

In preparing a semiconductor body for application of an oxide coating according to this invention, the body is etched, e.g., by a known etching process, to produce a clean oxide-free surface. Following etching, the etched surface is rinsed to remove any remaining etching agent. During this rinsing, the etched semiconductor surface is provided with an oxide coating (layer) according to the invention.

A sensitizing agent and (if desired) a chelate-former are added to the solvent (containing molecular oxygen) which is employed as the rinsing agent. Thereafter, the solution (containing the sensitizing agent and molecular oxygen) in which the semiconductor body is disposed is subjected (at room temperature) to daylight or shortwave light radiation for a period of time dependent upon the desired layer thickness. During this period the reaction of oxygen, organic substance and possibly also the solvent produces semiconductor surface oxidation.

To reinforce an oxide layer of the subject type, i.e., according to a variation of the present invention, a mixture of a photosensitizer (with or without one or more chelate formers) and a known polymer- or polycondensate-precursor is applied thereon and subjected to suitable light irradiation in an oxygen-containing atmosphere and for effecting polymerization or condensation and if required, to a heat treatment.

Precursors can be used which polymerize or polycondensate at room temperature. Such substances are, e.g., polysiloxanes having well hydrolysable substituted groups. During the polymerization or polycondensation the mixture can be irradiated for reaction of the sensitizer. Other precursors have a temperature at, e.g., 200° to 250°C of polymerization or polycondensation. Such substances are, e.g., polyamidimid or phenylmethylpolysiloxane.

Semiconductor body surfaces subjected to the process of the present invention and then covered with commerically available silicone lacquer (without any stabilizing additive) have a stabilizing and/or insulating coating which fully satisfies all of the requirements placed thereon. Coated semiconductors prepared in this way are useful in the same manner and for the same purposes as conventionally prepared and coated semiconductors.

The examples which follow are merely illustrative of the invention and in no way limit its scope.

EXAMPLE 1

Silicon semiconductor rectifier wafers having two contacting layers of nickel and gold and a (suitable) semiconductor surface polished by etching are cleaned for from 5 to 100 seconds, depending on the degree of contamination, in a solution consisting of 130 ml of 40 percent nitric acid and 830 ml of 99.9 percent acetic acid.

The etching process is interrupted by removing the wafers from the solution and subsequently rinsing them in deionized water for from 5 to 10 seconds. Thereafter the rinsed wafers are immersed in a solution enriched consisting of 1,000 ml of acetone and 1 gram of chlorophyl (porphyrin coloring agent) and enriched with oxygen. This solution comprising the semiconductor wafers is subjected to daylight radiation for a period dependent on the desired oxygen layer thickness.

Following, the wafers are rinsed in pure acetone and dried by infrared radiation. Thereafter a protective coating layer consisting of a polysiloxane resin having well hydrolysable substituted groups, e.g., acetoxy-groups, and highly dispersed silicid acid as a filling material is disposed on the silicon surface. This layer is polycondensed for from 24 to 48 hours at room temperature and at suitable air moisture. To remove volatile components from the coating layer, the wafers are finally heated for at least 1 to 2 hours to about 200°C.

EXAMPLE 2

Wafers are treated according to example 1 but with a solution enriched by oxygen and comprising, instead of chlorophyl, the coloring agent 1,1'-diamyl-4,4'-bis-quinolyl-monomethincyanide-iodide as a monomethincyanine of the polycyanines.

EXAMPLE 3

As a further coloring agent instead of chlorophyl can be used bis-(3-ethylbenzthio-)trimethin-cyanine-iodide of the polycyanines.

EXAMPLE 4

Yet another coloring agent for a process according to example 1 is rose bengal of the fluoranes.

EXAMPLE 5

Instead of the solution enriched by oxygen according to example 1, a mixture comprising a combination of chelate forming additives for nickel and gold impurities consists of 1,000 ml isopropanol, 1 gram of ethylenediamin as a chelate former with nickel and gold and of the polyamines, 1 gram of diacetyldioxime of the oximes and as a chelate former with nickel, and 0.01 gram of methyleneblue as a sensitizer.

EXAMPLE 6

Another solution with a sensitizer according to the present invention comprises a derivative of the fluoranes having the ability to bind gold impurities by chelate formation. Such solution consists of 1,000 ml methanol and 0.01 gram of Rhodamine B as a chelate former with gold.

EXAMPLE 7

Silicon controlled rectifier wafers having two contacting layers of aluminum and silver and a semiconductor surface polished by etching and beveled are treated with an acid combination consisting of 100 ml 100 percent nitric acid, 10 ml 70 percent hydrofluoric acid and 100 ml 85 percent phosphoric acid for 5 to 100 seconds. By removing the wafers from this combination and immediately rinsing them with deionized water, the etching process is finished. Then the wafers are immersed in an oxygen saturated bath consisting of 1,000 ml of methanol, 10 grams of ethylenediamine (a polyamine) as a chelate former with silver impurities and 0.1 grams of murexide (aza-compound of an anionic monomethine) as a coloring agent and the bath is subjected to daylight radiation. Thereafter the wafers are rinsed with deionized water, dried by acetone and infrared radiation and coated at its semiconductor surface with an insulating lacquer consisting of 30 grams of polyamidimid (resin), 70 grams N-methylpyrrolidon as solvent, 5 grams of aurintricarboxylic acid (a monomethine) as a sensitizer and a chelate former with gold and iron. This insulating lacquer coating can be irradiated with ultraviolet rays for 5 minutes, and then the polymerization of the lacquer takes place by a heating for 15 hours at 250°C.

EXAMPLE 8

Wafers are treated according to example 7 but with an oxygen saturated bath consisting of 1,000 ml of methanol, 50 grams of thiourea (of the polyamines) as a chelate former with silver and 0.01 gram of erythrosin (of the fluoranes) as a sensitizer.

EXAMPLE 9

At other unchanged process steps according to example 7 yet another bath can be used consisting of 1,000 ml of isopropanol and 0.01 gram of 5-(4-dimethylamino-benzyliden-rhodanin) with the other terms neutrocyanine, merocyanine as sensitizer and chelate former with silver.

EXAMPLE 10

Silicon semiconductor rectifier wafers softly soldered with a silver contact plate having a coating of lead are treated for from 15 to 60 seconds with an acid combination consisting of 90 ml 40 percent hydrofluoric acid, 90ml 100 percent acetic acid, 60 ml 85 percent phosphoric acid and 150 ml 37 percent hydrochloric acid. The etching process is interrupted by taking the wafers out of this combination and subsequently rinsing them in deionized water. Then the wafers are immersed in an oxygen saturated solution consisting of 1,000 ml of 90 percent ethanol, 300 grams of d(+)-tartaric acid (a polyol) as a chelate former and 0.01 gram celliton-yellow (a neutrocyanine) as a sensitizer. After subjecting the solution to daylight radiation, rinsing the wafers with deionized water, drying by actone and infrared irradiation its free semiconductor surface is covered with an insulating lacquer comprising 60 grams of phenylmethylpolysiloxane (pre-condensated). 40 grams of cyclohexanone as solvent, 5 grams of 9-phenyl-2,3,7-trihydroxy-6-fluoron (a fluorane) as sensitizer and chelate former. After ultraviolet ray irradiation for about 5 minutes the polycondensation of the lacquer is carried out for 15 hours at 200°C.

It will be understood that the above description of the present invention is susceptible to various modifications, changes and adaptations, and the same are intended to be comprehended within the meaning and range of equivalents of the appended claims.

I claim:

1. A semiconductor body of an element of Group IV of the periodic table or a compound of elements of Groups III and V of the periodic table having a surface coated with a protective oxide layer including at least one organic coloring agent, the coloring agent having a molecular configuration with conjugated double bonds and being a member of a class which promotes oxidation on exposure to light radiation having a wavelength of from 0.01 micron to 1 micron.

2. A coated semiconductor surface according to claim 1 wherein the oxide layer further includes a chelate-forming substance or chelate with ionizable foreign matter.

3. A coated semiconductor surface according to claim 1 wherein on the oxide layer is a layer of a polymeric or polycondensate substance including an organic coloring agent and at least on chelate former.

4. A coated semiconductor surface according to claim 2 wherein at least one organic coloring agent which promotes oxidation is also a chelate-former.

5. A process for providing a protective oxide coating on a surface of a semiconductor body of an element of Group IV of the periodic table or a compound of elements of Groups III and V of the periodic table comprising the steps of: wetting said surface of said semiconductor body with a liquid solvent containing molecular oxygen and having dissolved therein at least one organic coloring agent which has a molecular configuration with conjugated double bonds, promotes oxidation of the semiconductor surface on exposure to light energy and is soluble in the liquid solvent to the extent of about $10^{-2}$ mol per liter or less; and oxidizing the semiconductor surface by exposing the organic coloring agent dissolved in the liquid solvent to the light energy required for oxidation.

6. A process according to claim 5 wherein the liquid solvent is a member selected from the group consisting of water, di(lower)alkylketone and lower alkanol.

7. A process according to claim 5 wherein the light energy comprises radiation having a wavelength in the range of from 0.01 micron to 1 micron.

8. A coated semiconductor surface according to claim 1 wherein said organic coloring agent which promotes oxidation is a member selected from the group consisting of a porphyrin coloring agent, a polymethine coloring agent, a thiazine coloring agent and a fluorane coloring agent.

9. A process according to claim 5 wherein the liquid solvent has dissolved therein at least one organic additive means for binding foreign ions by forming a chelate therewith and further comprising heating the semiconductor surface.

10. A process according to claim 5 wherein said at least one coloring agent which promotes oxidation is also a chelate-former.

11. A process according to claim 5 which comprises exposing the organic coloring agent dissolved in the liquid solvent to the light energy required for oxidation and then heat-treating the thus-exposed product, and wherein the organic coloring agent photosensitizes oxidation of the semiconductor surface, and the liquid solvent has a capacity for containing molecular oxygen, is a solvent for the organic coloring agent, is capable of transmitting light of a wavelength suitable for activating the organic coloring agent and contains a sufficient supply of oxygen for reaction with the organic coloring agent.

12. A process according to claim 5 wherein said at least one organic coloring agent which promotes oxidation is a member selected from the group consisting of a porphyrin coloring agent, a polymethine coloring agent, a thiazine coloring agent and a fluorane coloring agent.

* * * * *